2 Sheets—Sheet 1.

H. NASH,

J. BRINKERHOFF, Assignee of A. E. NASH, Adm'r. of H. NASH dec'd.

CLOTHES-WRINGER.

Reissued May 2, 1876.

No. 7,090.

Witnesses:

P. C. Dieterich

Wm. Kupperman.

Inventor:

Hiram Nash by Jacob Brinkerhoff assignee

Per: C. H. Watson & Co. Attorneys.

H. NASH,

J. BRINKERHOFF, Assignee of A. E. NASH, Adm'r. of H. NASH dec'd.

CLOTHES-WRINGER.

No. 7,090. Reissued May 2, 1876.

Witnesses:

P. C. Dieterich.

Wm B. Upperman.

Inventor:

Hiram Nash by Jacob Brinkerhoff assignee

Per: C. H. Watson & Co Attorneys.

UNITED STATES PATENT OFFICE.

JACOB BRINKERHOFF, OF AUBURN, NEW YORK, ASSIGNEE OF ANN E. NASH, ADMINISTRATRIX OF HIRAM NASH, DECEASED.

IMPROVEMENT IN CLOTHES-WRINGERS.

Specification forming part of Letters Patent No. 58,669, dated October 9, 1866; reissue No. 7,090, dated May 2, 1876; application filed April 8, 1876.

*To all whom it may concern:*

Be it known that HIRAM NASH, deceased, late of Cincinnati, in the county of Hamilton and State of Ohio, did invent certain new and useful Improvements in Clothes-Wringers, whereof the following is a full, clear, and exact description thereof, that will enable others skilled in the art to which it appertains to make and use the same, reference being had to the accompanying drawings, and to the letters of reference marked thereon, which form a part of this specification.

Figure 1:
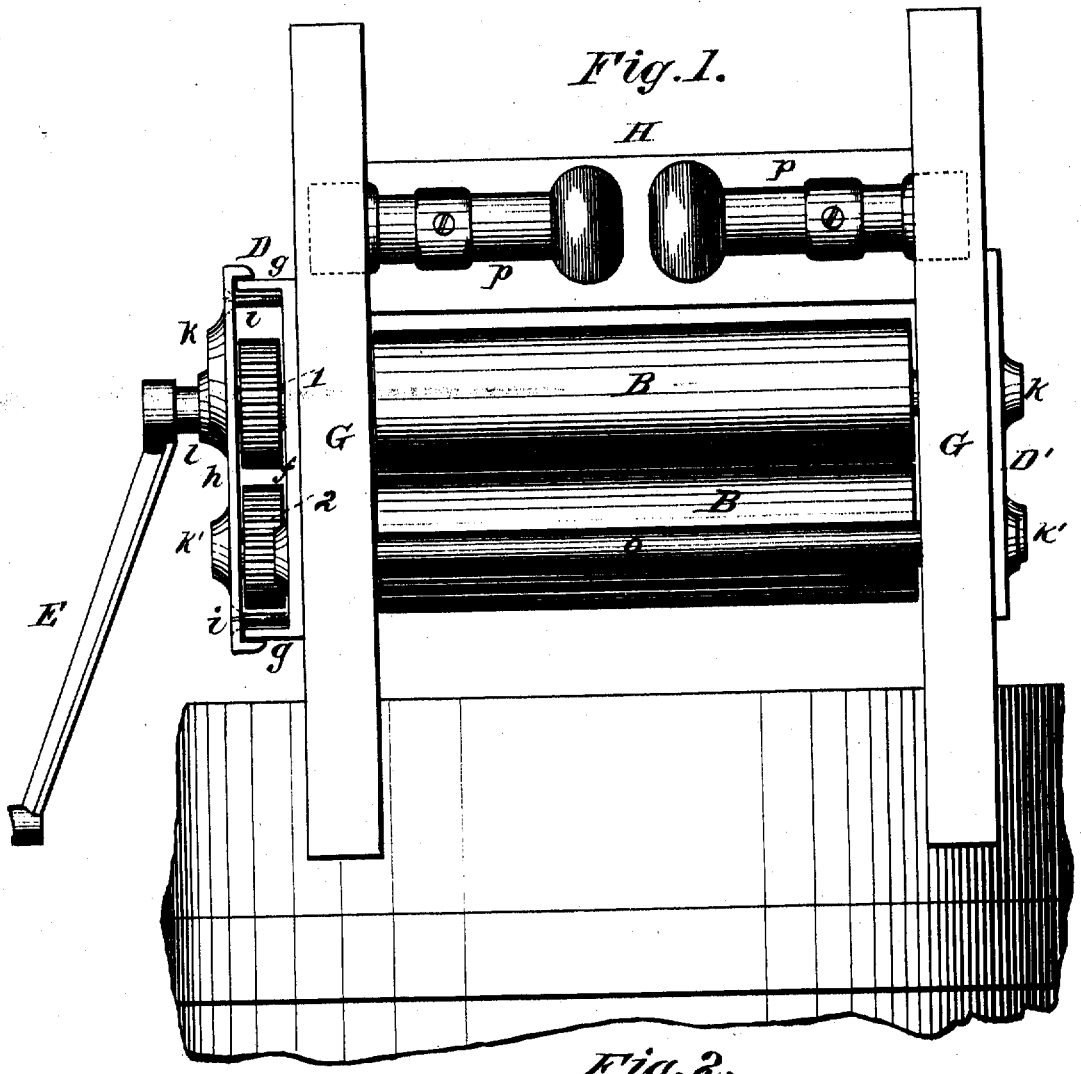
Figure 2:
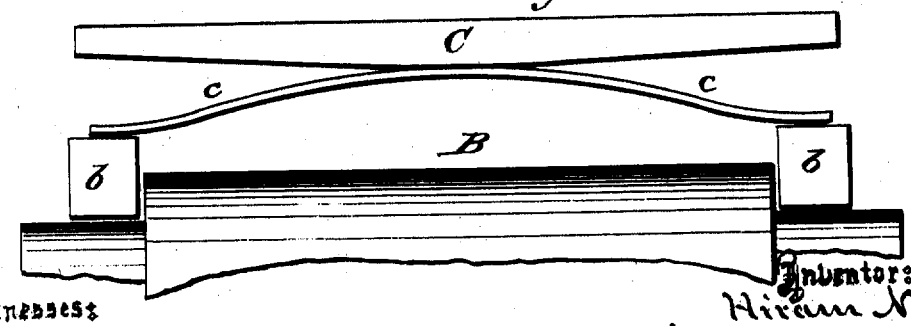
Figure 3:
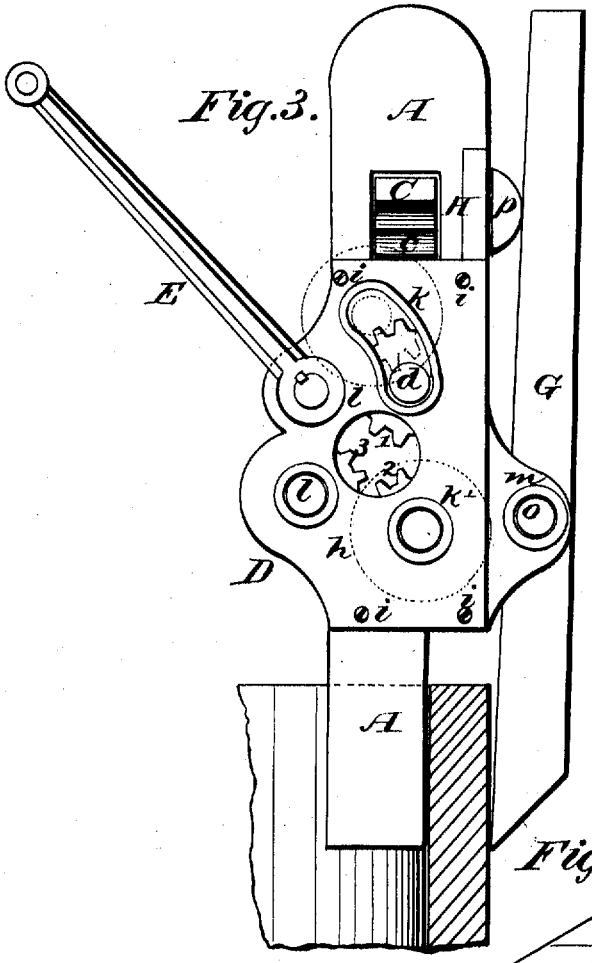
Figure 4:
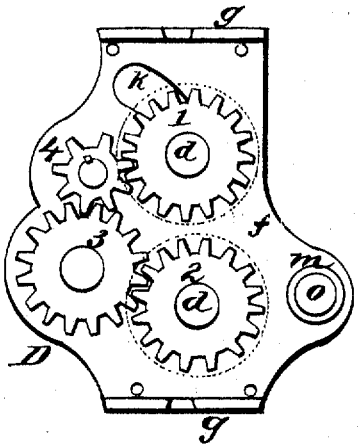
Figure 5:
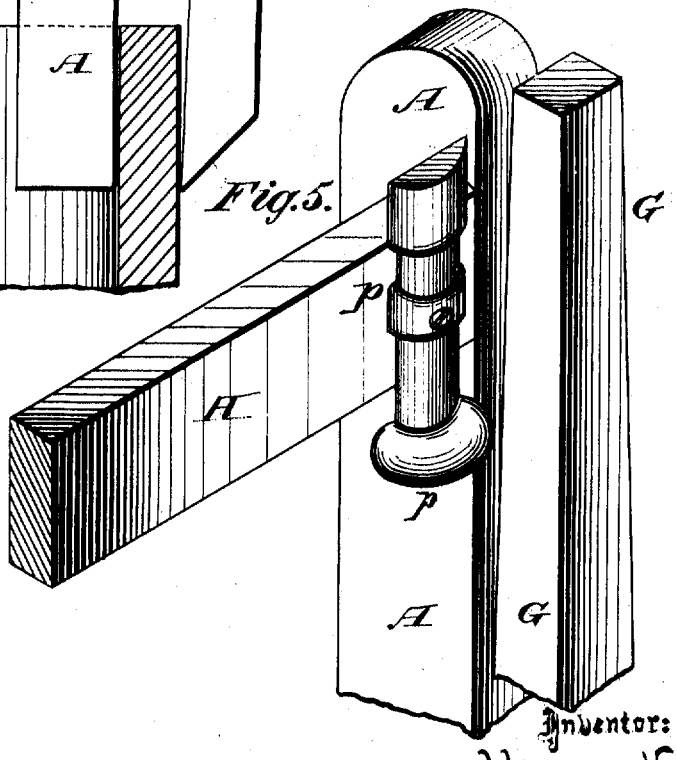

Figure 1 is an elevation of the improved machine applied to a tub or washing-machine. Fig. 2 is a diagram, showing the bar and spring for compressing the rollers. Fig. 3 is an end elevation of the machine. Fig. 4 is a view of the inner plate of the case with the gearing situated inside. Fig. 5 is a perspective view of one side of the clamping arrangement.

Like letters of reference indicate corresponding parts in all the figures.

This invention consists essentially in a box or case at the crank end of the machine, inclosing an improved arrangement of gearing that insures a more perfect working of the rollers, and in the means of securing the machine to the tub or receptacle; also, in the combination of the driving-pinion with connecting mechanism for imparting motion to the rolls, and a clamping device and supporting-frame, as will be hereinafter more fully described.

As represented in the drawings, A A are the standards, and B B the rubber rollers, which do not differ essentially from the corresponding parts of other machines. The standards are provided with vertical slots *a a*, in which rest sliding bearings *b b*, that sustain the journals of the upper rollers. On the bearings *b b* rest the ends of a half-elliptic spring, *c*, secured centrally to a cross-bar, C. This arrangement gives the necessary elasticity to the upper roller. The lower roller is stationary in position. To the crank end of the machine is secured a metallic case, D, and to the opposite end a simple plate, D′, which serves as a bearing for the journals *d d* of the rollers. The case is made of two parts, a plate, *f*, having projecting ends *g g*, and a cover, *h*, fitting over it, and secured in place by screws *i i*, or some equivalent means. Within the case thus formed is situated a set of gears, consisting of two spur-wheels, 1 2, secured to the ends *d d* of the rollers, a third wheel, 3, engaging with 2, and a pinion, 4, on the shaft of crank E, gearing into both 1 and 3. The wheels 1 2 3 are of equal size, while pinion 4 is but half size of the others. The case and plate D D′ are each provided with bearings *k k* to receive the journals of the rollers, and the former also with bearings *l l′*, for the wheel and pinions 3 4.

The bearings *k* for the upper roller are made of considerable extent, and concentric with the axis of pinion 4, as shown in Fig. 3. Thus arranged, the gears are held firmly in the case D, and can be removed only by design. They are, therefore, compelled to run true, however great the strain may be.

In ordinary wringing-machines much difficulty is experienced from the end action of the rollers. In this arrangement, by reason of the case D, there can be no difficulty from this source, and no jarring or vibration. By being thus inclosed in the case, as described, the gears are less exposed to water than if open.

Gearing has been before employed in wringers, and is, therefore, not here claimed broadly. In all such machines, however, the upper roller cannot be raised without either creating a looseness and irregularity in action, (as where two gears with long teeth intermatch,) or an unequal leverage, (as where a pin projects into a slot of the upper gear.) In this case it matters not what position the rollers assume, the action is always the same, and the leverage uniform and equal. There is no more strain when the rollers are separated than when they are in contact.

By making the driving-pinion 4 half the size of the other gears, not only a greater leverage is obtained, and consequently greater ease in turning the crank, but, with the usual speed of turning, a slower motion of the rollers is obtained.

In ordinary machines the operator, in feeding the clothes between the rollers, and operating the crank at the same time, attains a certain degree of speed of turning which it is difficult to modify or change. This speed gives too much action to the rollers, and the water is therefore frequently imperfectly expressed, and the clothes are torn or injured.

As heretofore constructed, with the crank attached to the shaft of one of the rolls, great difficulty and inconvenience, and consequent imperfect work, are often experienced in using wringing-machines, which, when in use, are clamped to the wash-tub by means of a clamping device with which they are provided, for in wringing large articles the strain on the crank is so great that the operator has to employ the hand, which is needed to straighten and adjust the clothes as they pass between the rolls, to hold the tub from being tipped or twisted from the bench, while turning the crank with the other, and as it often requires the strength of both arms to turn the crank, another party has to be employed to hold the tub in position. But by the employment of a driving-pinion of smaller size than the gears on the ends of the rolls, through which to turn the rolls, the crank is relieved of a great portion of the strain, and the tub remains steady in its place; hence the operator is relieved from the necessity of holding the tub from being tipped or twisted from the bench, or of employing some one else to do it, and one hand is left free to adjust and arrange the clothes as they pass between the rolls, and unless the clothes are kept adjusted evenly while they are passing between the rolls they will be but imperfectly wrung; hence a very important, new, and useful result is attained by the use of this small driving-pinion in this kind of wringers, and it is believed there is no previous case where this small driving-pinion has been used in a wringer provided with a clamping device, and hence, also, the clamping device is much less liable to be broken by the strain from the crank, as in all wringers heretofore made in which a clamping device is used, and where the power is communicated directly to the rolls from the crank, and consequently requiring greater power than in this invention, the entire power is brought to bear upon the clamp holding the machine to the tub, hence many clamps are broken; whereas in this invention less strain comes upon the clamp, thereby allowing them to be made of less material, and less liable to be broken, and also saves the sides of the tub from injury.

It will be noticed that as the upper roller B is raised in the concentric slots *k k* it inclines back over the body of the tub or receptacle in which are the clothes to be wrung, as indicated in Fig. 3. In this condition it is in the most convenient position for the entrance of the clothing between the rollers, and for the escape of the expressed water. The greater the separation of the rollers the more is their inclination to the receptacle.

The case and plate D D′ are also provided with the bearings *m m* at a suitable position on the outside, to which are jointed by a rod, *o*, or equivalent, clamps G G, which hold the machine to the side of the tub or receptacle. The clamps are substantially of the form shown, and are tightened by means of buttons or wedges *p p* pivoted to a cross-piece, H, and turning down between the standards and clamps at the top.

It is known that, broadly, it is not new to operate the rolls of a wringing-machine by a pinion of smaller size than the gears on the ends of the rolls, as shown in patent to N. B. White, March 4, 1862.

Having thus fully described the invention, what is claimed as new, and desired to be secured by Letters Patent, is—

1. The combination of the inclosing-case D, made up of the plate *f* and cover *h*, and provided with the concentric bearing *k k* and the set of gearing 1 2 3 4, arranged as described, the whole used in connection with rollers B B, substantially in the manner and for the purpose specified.

2. In a wringing-machine, a driving-pinion of smaller size than the gears on the ends of the rollers, and suitable connecting mechanism for imparting motion to the rolls, in combination with a supporting-frame having a clamping device and squeezing-rollers, for the purpose set forth.

In testimony whereof I have hereunto set my hand this 7th day of April, A. D. 1876.

JACOB BRINKERHOFF,
*Assignee of Hiram Nash, deceased.*

Witnesses:
WM. B. UPPERMAN,
C. H. WATSON.